United States Patent [19]
Veghte et al.

[11] Patent Number: 5,771,021
[45] Date of Patent: Jun. 23, 1998

[54] TRANSPONDER EMPLOYING MODULATED BACKSCATTER MICROSTRIP DOUBLE PATCH ANTENNA

[75] Inventors: Richard L. Veghte, Jacksonville, Oreg.; Curtis L. Carrender, Placitas, N. Mex.; Alfred R. Koelle; Jeremy A. Landt, both of Santa Fe, N. Mex.

[73] Assignee: Amtech Corporation, Dallas, Tex.

[21] Appl. No.: 550,628

[22] Filed: Oct. 31, 1995

Related U.S. Application Data

[63] Continuation-in-part of Ser. No. 395,641, Feb. 28, 1995, abandoned, which is a continuation of Ser. No. 134,862, Oct. 4, 1993, abandoned.

[51] Int. Cl.⁶ ..................................................... H01Q 1/38
[52] U.S. Cl. ..................................... 343/700 MS; 342/51
[58] Field of Search ....................... 343/700 MS; 342/51, 342/175, 42, 44, 50; H01Q 1/38

[56] References Cited

U.S. PATENT DOCUMENTS 4,786,907 11/1988 Koelle ........................................ 342/51
5,119,099 6/1992 Haruyama et al. ....................... 342/51

OTHER PUBLICATIONS

Gerald Hall, "The ARRL Antenna Book", The American Radio Relay League, 1983, pp. 2–6–2–10.

*Primary Examiner*—Hoanganh T. Le
*Attorney, Agent, or Firm*—Fish & Richardson P.C.

[57] ABSTRACT

A reader interrogates a transponder attached to a remote object. The transponder includes a microstrip patch antenna having two segments connected together by a switch, each segment being one-half wavelength, the antenna being a full wavelength at the frequency of the interrogating signal. In response to a control signal, the switch is opened and closed, thereby coupling and decoupling the two segments of the microstrip antenna. When the switch is in the closed position, the two segments are out-of-phase with one another, thereby producing a maximum reflected signal. When the switch is in the open position, the two segments act in concert to produce a minimum backscattered signal. The backscatter signal is thus modulated in accordance with the control signal and is received at the reader where it is subsequently decoded to identify the remote object.

5 Claims, 4 Drawing Sheets

TRANSPONDER EMPLOYING MODULATED BACKSCATTER MICROSTRIP DOUBLE PATCH ANTENNA

CROSS REFERENCE TO RELATED APPLICATIONS

This is a continuation-in-part of a patent application, Ser. No. 08/395,641, filed on Feb. 28, 1995, abandoned, entitled "Modulated Backscatter Microstrip Patch Antenna" by Veghte, et al. which is a continuation of application Ser. No. 08/134,862, filed Oct. 4, 1993, now abandonded, both of which are expressly incorporated by reference herein.

BACKGROUND OF THE INVENTION

1. Field of the Invention

This invention relates to systems for identifying objects using a remote transponder and, more particularly, relates to such a transponder employing a microstrip double patch antenna.

2. Background Art

Systems for remote identification of objects are being used for many purposes, such as identifying vehicles passing through a toll station on a highway, identifying cargo containers located onboard a ship, or identifying rail cars. More generally, these systems provide a two-way communications means between a reader and a transponder (or "tag"). The tag can store information such as the condition of the equipment of interest, fuel levels, time of day, temperature, ownership of the cargo, etc. This information can be updated as conditions change and subsequent reading of the tags (say, as the rail car travels along a track) can keep human operators apprised of the condition of the cargo. An alternative use of these tags and readers allows the reader to be placed in the locomotive and the tags positioned at fixed points along the rail line. Then, as the locomotive travels along the track, it can continually update its location by reading position information stored in the tags.

Such systems use RF signals to communicate information between a reader apparatus and a transponder attached to the object. Some systems include both "read" and "write" functions; that is, the reader apparatus can read information previously stored in the transponder's memory and the transponder can also write new information into its memory in response to signals from the reader.

Typically, each transponder has an individual code containing information related to and identifying the associated the container. In operation, the reader sends an RF signal to the remote transponder. An antenna at the transponder receives the signal from the reader, backscatter modulates the received signal with data temporarily or permanently stored in the transponder (such as data indicating the identity and contents of the object to which the transponder is attached), thereby producing a sequence of signals in accordance with the transponder's individual code, and reflects this modulated signal back to the reader in order to pass the information contained in the transponder memory to the reader. The reader decodes these signals to obtain the information from the transponder.

Likewise, the transponder may decode signals received from the reader and write information to the transponder's memory. Systems and transponders employing such features are described in one or more of U.S. Pat. Nos. 4,739,328; 4,786,907; 4,816,839; 4,782,345; 4,853,705; and 4,835,377. These disclosures are hereby incorporated by reference.

The transponder systems presently in use have suffered from certain limitations. One difficulty has resulted from the limited range of transmission of the identifying signals from the transponder to the reader. Another related difficulty has resulted from RF interference. Interference produced by the transponder's antenna can prevent the reader from properly detecting the pattern of binary ones and zeros in the sequence individually identifying the object. Additionally, interference produced by the transponder's logic circuitry can prevent accurate decoding of data to be written into the transponder's memory.

Other problems with prior designs have been difficulties encountered in achieving a good impedance match between the antenna and the modulating element and difficulties in producing an efficient modulating element.

A considerable effort has been devoted over a number of years to eliminate or at least minimize these problems. In spite of these efforts, such problems have persisted. The range of communications between the reader and the transponder continues to be limited by the effects of noise. This has tended to limit the range of uses to which systems for identifying objects can be applied.

SUMMARY OF THE INVENTION

The present invention provides a transponder employing a patch antenna system capable of producing an enhanced signal power level in comparison to the transponders of the prior art. As a result, the effective range of the transponder is increased relative to the transponders of the prior art. Additionally, the transponder and antenna system of the present invention reduces the amount of undesired backscatter that can interfere with detection and identification by a reader and improves the transponder's ability to detect data to be written into the transponder's memory.

Briefly, the invention provides a transponder which employs a microstrip double patch antenna for emitting backscatter modulated signals in response to an interrogating signal. The double patch antenna has two segments that are connected together by a switch. When the switch is closed, the antenna resembles a full wavelength antenna with its two segments out-of-phase with respect to one another. This results in a maximum backscatter signal. When the switch is opened, the two segments of the antenna act so as to produce a mimimum backscatter signal. Multiple pairs of such antennas can be connected together to make a single antenna for the transponder with increased signal power.

DETAILED DESCRIPTION

Figure 1:
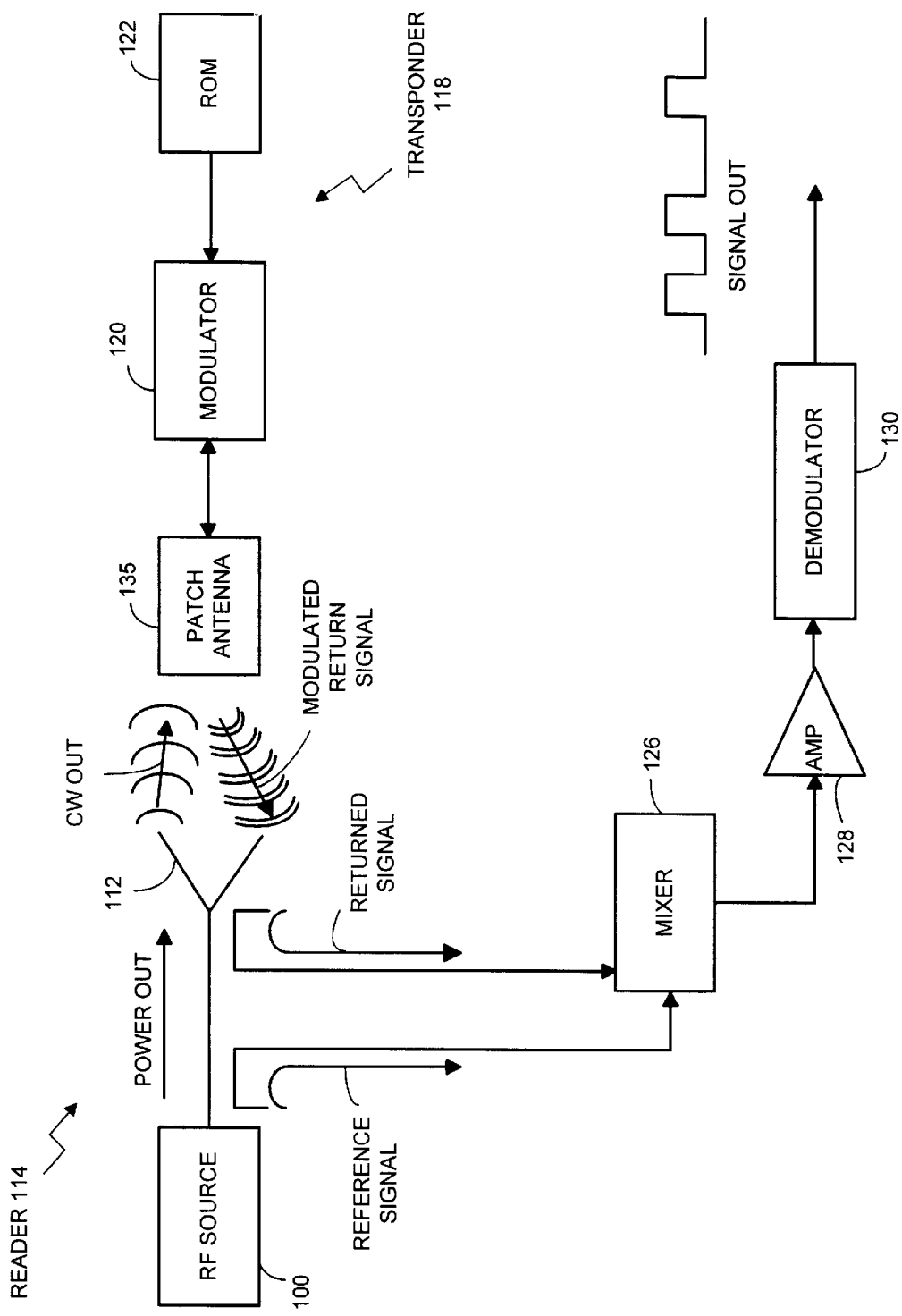
FIG. 1 is a block diagram of a reader and transponder system which incorporates the microstrip double patch antenna.

Referring now to FIG. 1, a reader and transponder system employing the microstrip double patch antenna is shown. In one embodiment, a source 100 of interrogating RF signals is connected to an antenna 112 at a reader generally indicated at 114. The interrogating RF signals from the source 100 may have a suitable frequency such as 915 megahertz (915 MHz). It will be appreciated by those skilled in the art that this frequency corresponds to the frequency reserved for operation of such systems in the United States and Hong Kong. Other frequencies may be used in other countries and it will be appreciated that the physical size of the patch antenna will be adjusted accordingly with these fundamental frequencies. When the source 100 of interrogating RF signals is energized, the antenna 112 transmits the interrogating signals in the direction of the transponder, generally indicated at 118. The interrogating signal is typically a continuous wave (cw) signal. The transponder 118 is typically attached to a remote object (not shown), which may be a cargo container on a ship or a railroad freight car, etc. The transponder 118 includes a data source, such as read only memory 122, which provides a sequence of binary ones and zeros. The binary sequence is set to uniquely identify the object to which the transponder 118 is attached.

Figure 2:
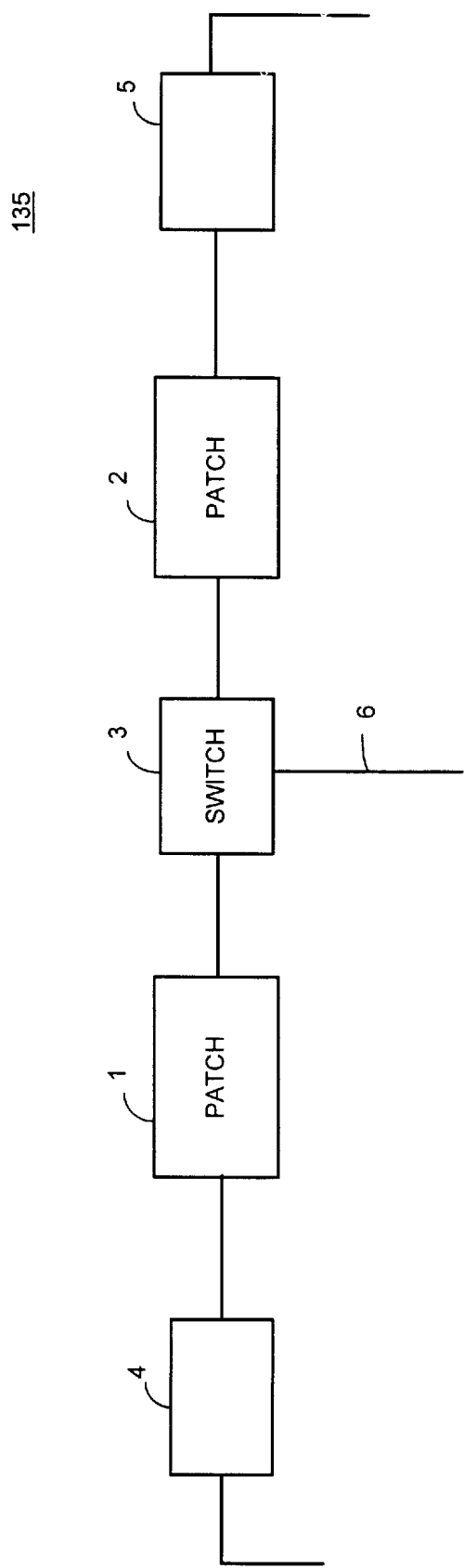
FIG. 2 is schematic diagram of a preferred embodiment of the microstrip double patch antenna.

In operation, the RF signal transmitted from antenna 112 is received at the microstrip double patch antenna 135, which is coupled to transponder 118. Referring now to FIG. 2, the microstrip double patch antenna includes patches 1 and 2 which are preferably substantially the same in size and shape. A preferred embodiment uses patches having linear polarization, although patches having other polarizations, such as circular polarization, may also be used. Patches 1 and 2 are connected through switch 3, which in the preferred embodiment is a GaAs FET switch, well known in the art. In other embodiments, other switches may be used, for example MOS or bipolar transistor switches or voltage controlled diodes. Switch 3 is controlled by a modulating signal received through line 6.

A binary one in read only memory 122 causes a modulator 120 to produce a first modulating signal on line 6. Similarly, a binary zero in read only memory 122 causes modulator 120 to produce a second modulating signal on line 6. The signals produced by modulator 120 to be transmitted to switch 3 through line 6 represent the pattern of binary ones and zeros which are used to uniquely identify the object to which transponder 118 is attached. As will be discussed below, the signals cause switch 3 to turn on and off in accordance with the binary one or zero to be transmitted.

As shown in FIG. 2, patches 1 and 2 are connected to switch 3 on opposite sides; i.e., switch 3 is connected to patch 1 on its left side and to patch 2 on its right side. Therefore, when switch 3 is closed (on), the edges of the two patches which are coupled together are 180 degrees out-of-phase with respect to one another. That is, the two segments are shorted, resulting in the microwave current being a maximum and the microwave voltages being a minimum at the ends of the segments. In the preferred embodiment, patches 1 and 2 are each one-half wavelength antennas, but other fractional wavelength antennas, such as one quarter wavelength antennas, may also be used. As a result, for the preferred embodiment coupling patches 1 and 2 together produces a full wavelength antenna (as measured at the RF frequency of the interrogating signal) with its two segments out-of-phase with respect to one another. Because patches 1 and 2 are out-of-phase with respect to one another, the antenna is "anti-resonant," resulting in a backscatter signal being reflected to reader 114.

When switch 3 is open (off), patches 1 and 2 are unconnected. As a result, the antenna is resonant and a minimum backscatter signal is produced.

It will be appreciated that switch 3 is opened and closed in accordance with the modulating signal transmitted on line 6. The modulating signal corresponds to the identifying code stored in ROM 122. Thus, the backscatter signal produced by patch antenna 135 will consist of "nulls" and "peaks" in the backscatter pattern according to whether switch 3 is open or closed. In this way, a modulated backscatter signal is produced at transponder 118. This modulated backscatter signal is then received at antenna 112.

At the reader 114, the antenna 112 introduces the received signals to a mixer 126. The received signals are combined with the interrogating RF signals from the source 100 and the resulting signal is introduced to an amplifier 128 and subsequently demodulated in a demodulator 130. The demodulator 130 produces an output signal in a sequence having a pattern identifying the pattern of ones and zeros originally stored in read only memory 122 at transponder 118. This sequence may be compared in the reader with a table of stored signals or other means to determine the identify of the object which transponder 118 is attached.

As shown in FIG. 2, detect devices 4 and 5 are connected to patches 1 and 2, respectively, on the sides of the patch opposite the connection to switch 3. In a preferred embodiment, detect devices 4 and 5 are zero bias Schottky diodes. Other devices, such as planar doped barrier diodes may also be used. Detect devices 4 and 5 are used to receive both data to be written into the transponder and signals to control the operation of the transponder. In some embodiments, this could be a signal which is used to turn switch 3 on and off in conjunction with the signal produced by modulator 120. It will be appreciated that in those transponders which permit write operations, ROM 122 could be replaced by an EEPROM or a similar device which would allow data to be written to it.

Because detect devices 4 and 5 are attached directly to patches 1 and 2 and are located remote from switch 3, they are isolated from the transponder's modulating signal, thus reducing interference and improving signal detection.

Locating detect devices 4 and 5 on the outside of patches 1 and 2 also reduces the amount of board or chip space required to accommodate the transponder circuit, which facilitates placement of the transponder in smaller areas or on small objects. In addition, the use of two detect lines, one to each patch, in combination with the switch 3 in-between patches represents an improvement over prior art antennas that used only a single line to a single dipole antenna.

Figure 3:
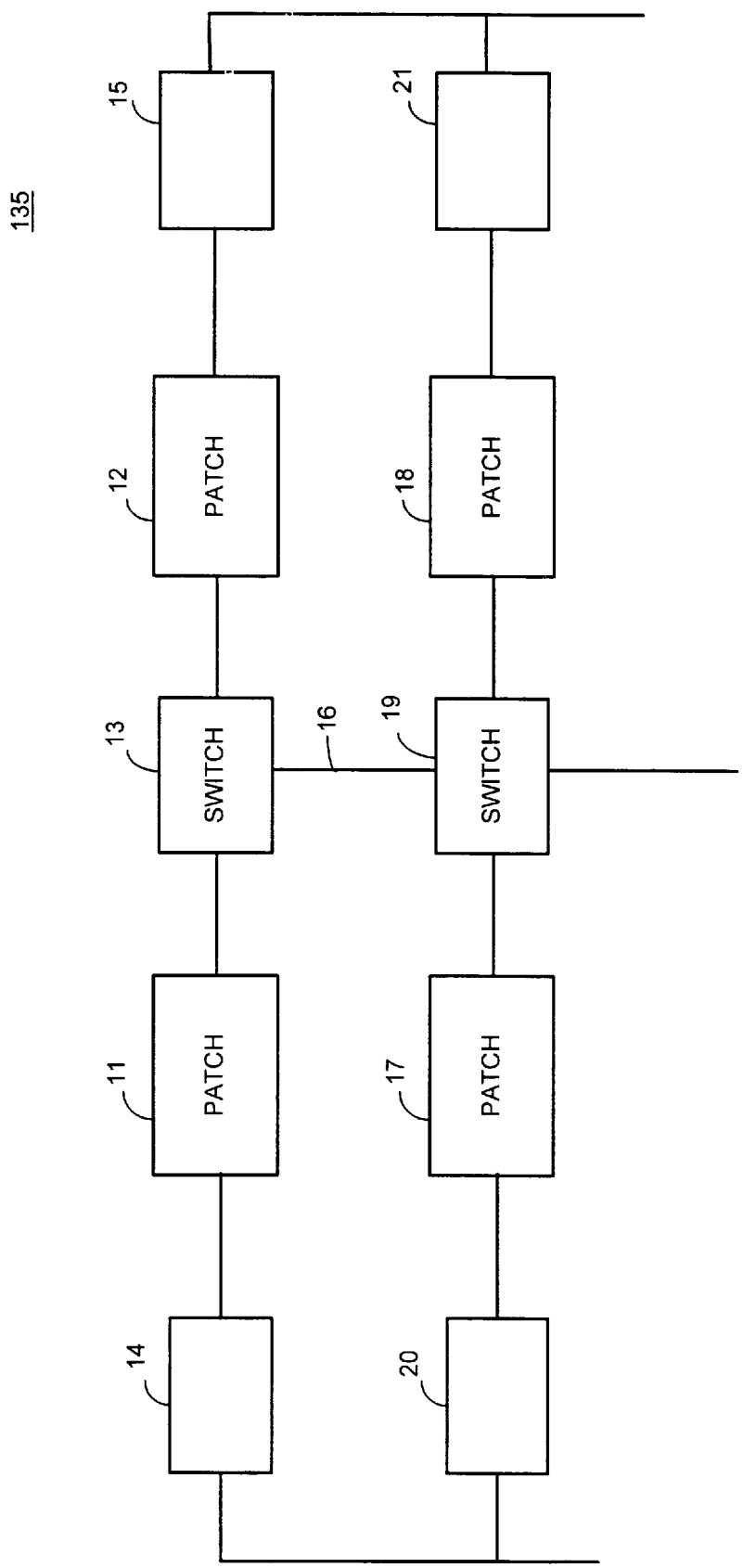
FIG. 3 is a schematic diagram of an alternative embodiment of the microstrip double patch antenna.

In an alternative embodiment, a plurality of pair of patches are connected together to make a single antenna. Multiple pairs can be switched simultaneously in "gangs", each pair having its own switch. In FIG. 3, for example, patches 11 and 12 are connected through switch 13, as in FIG. 2. In addition, patches 17 and 18 are connected through switch 19. Patches 17 and 18 are preferably, but not necessarily, substantially the same as patches 11 and 12. Switch 19 is controlled by the same modulating signal that controls switch 13 and is received through line 16, thus ensuring that both pairs of patches will be switched simultaneously. Detect devices 20 and 21 are connected to patches 17 and 18, respectively, and are used to receive data in the same way that detect devices 14 and 15 are used by patches 11 and 12, respectively. The use of multiple pairs increases the signal power level of the antenna when all switches are in the open (off) position so as to produce a backscatter modulation pattern.

Figure 4:
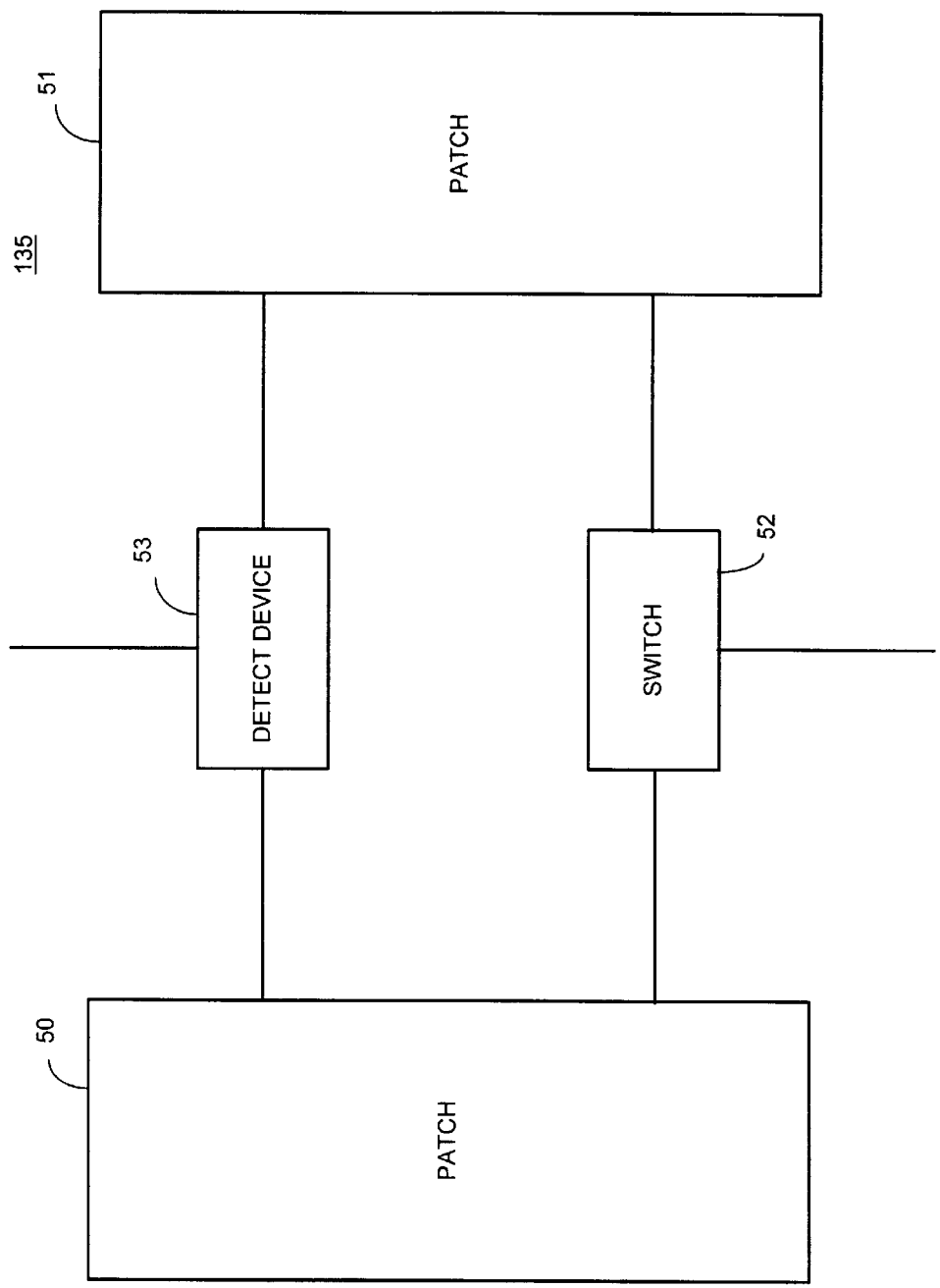
FIG. 4 is a schematic diagram of yet another alternative embodiment of the microstrip double patch antenna.

In the alternative embodiment of FIG. 4, a single detect device 53 is located between and connected to patches 50 and 51. Switch 52 and detect device 53 may be separate devices or combined into a single device. The embodiment of FIG. 4 is particularly useful in applications where a minimum of board or chip space is available. However, due to the close proximity of detect device 53 and switch 52, the embodiment of FIG. 4 does not reduce interference or improve signal detection to the same degree as the preferred embodiment.

Thus, a novel and reader and transponder system employing a microstrip double patch antenna has been described. It will be appreciated by those skilled in the art that many changes in the apparatus and methods described above may be made without departing from the spirit and scope of the invention, which should, therefore, be limited only as set forth in the claims which follow.

What is claimed is:

1. A system including a reader and a transponder displaced from the reader for identifying an object associated with the transponder, said system comprising:

interrogating means at the reader for transmitting interrogating signals at an RF frequency to the transponder;

a microstrip patch antenna at the transponder for receiving the interrogating signals and for transmitting backscatter-modulated signals in response to the interrogating signals in accordance with a modulating signal produced by modulating means at the transponder, the modulating signal identifying the object associated with the transponder, the antenna comprising two one-half wavelength segments, at least one of which has an input line for receiving an external signal, connected together by a switch having a closed position and an open position, the antenna being full wavelength at the RF frequency, the two segments of the antenna being out-of-phase with each other when the switch is in the closed position, whereby a backscatter signal is reflected back to the reader, and the two segments of the antenna acting in concert when the switch is in the open position, whereby a minimum backscatter signal is reflected back to the reader;

and a switching circuit for actuating the switch between the open position and the closed position in response to the external signal.

2. A system according to claim 1 wherein each of the segments has linear polarization.

3. A system according to claim 1 wherein each of the segments has circular polarization.

4. A method of identifying a remote object using an interrogator and a transponder located at the remote object comprising the steps of:

transmitting an interrogating signal from the interrogator, the interrogating signal being at an RF frequency;

receiving the interrogating signal at the transponder, the transponder comprising a microstrip patch antenna, the microstrip patch antenna comprising two one-half wavelength segments, at least one of which has an input line for receiving an external control signal associated with the remote object, connected together by a switch having a closed position and an open position, the microstrip patch antenna being full wavelength at the RF frequency;

responding to the interrogating signal via a backscatter-modulated signal produced by the microstrip patch antenna, wherein when the switch is in the closed position, the two segments of the microstrip patch antenna are out-of-phase with each other, thereby producing a backscatter signal as seen by the reader, and when the switch is in the open position the two segments of the microstrip patch antenna act in concert, whereby a minimum backscatter signal is produced, the switch being opened and closed by a switching circuit in response to the external control signal associated with the remote object; and receiving the backscatter-modulated signal at the reader and demodulating the backscatter-modulated signal to produce an identifying signal associated with the remote object.

5. A transponder comprising:

a modulator generating a control signal; and a patch antenna coupled to the modulator for emitting backscatter-modulated signals at a fundamental frequency in response to a received signal, the patch antenna comprising two one-half wavelength segments, at least one of which has an input line for receiving an external signal, connected together by a switch having a closed position and an open position, the antenna being full wavelength at the fundamental frequency, the two segments being out-of-phase with each other when the switch is in the closed position, whereby a backscatter signal is emitted in response to the received signal, and the two segments of the antenna acting in concert when the switch is in the open position, whereby a minimum backscatter signal is emitted in response to the received signal, and the two segments of the antenna acting in concert when the switch is in the open position, whereby a minimum backscatter signal is produced in response to the received signal;

a switching circuit for actuating the switch between the open position and the closed position in response to the external signal;

wherein the switch opens and closes in response to the control signal.

* * * * *